United States Patent
Musashi et al.

(10) Patent No.: US 9,891,368 B2
(45) Date of Patent: Feb. 13, 2018

(54) MULTILAYER SHEET

(71) Applicant: NIPPON CARBIDE INDUSTRIES CO., INC., Minato-ku, Tokyo (JP)

(72) Inventors: Naoki Musashi, Namerikawa (JP);
Ippei Imagawa, Namerikawa (JP);
Ichiro Uchijima, Namerikawa (JP);
Ikuo Mimura, Uozu (JP)

(73) Assignee: NIPPON CARBIDE INDUSTRIES CO., INC., Minato-ku (Tokyo) (JP)

( * ) Notice: Subject to any disclaimer, the term of this patent is extended or adjusted under 35 U.S.C. 154(b) by 39 days.

(21) Appl. No.: 14/782,846

(22) PCT Filed: Apr. 9, 2014

(86) PCT No.: PCT/JP2014/060324
§ 371 (c)(1),
(2) Date: Jan. 25, 2016

(87) PCT Pub. No.: WO2014/168182
PCT Pub. Date: Oct. 16, 2014

(65) Prior Publication Data
US 2016/0131819 A1 May 12, 2016

(30) Foreign Application Priority Data

Apr. 11, 2013 (JP) .................. 2013-083271

(51) Int. Cl.
*F21V 8/00* (2006.01)
*G02B 1/04* (2006.01)
(Continued)

(52) U.S. Cl.
CPC .............. *G02B 6/0041* (2013.01); *B32B 3/26* (2013.01); *B32B 5/16* (2013.01); *B32B 27/14* (2013.01);
(Continued)

(58) Field of Classification Search
CPC ........ G02B 6/0065; G02B 1/045; B32B 5/30; B32B 25/047; B32B 2264/102; B32B 2307/412; B32B 2307/418; B32B 2457/20
See application file for complete search history.

(56) References Cited

U.S. PATENT DOCUMENTS

2009/0326155 A1* 12/2009 Tomita ............... C08G 18/6229
525/228
2012/0156456 A1* 6/2012 Niimi ..................... C09J 7/0267
428/214
2014/0212645 A1* 7/2014 Mimura ................. G02B 6/002
428/212

FOREIGN PATENT DOCUMENTS

CN 102471650 A 5/2012
JP 2001100003 4/2001
(Continued)

OTHER PUBLICATIONS

Written Opinion of the ISA priority application PCT/JP2014/060324 dated Jul. 15, 2014, 3 pages.
(Continued)

*Primary Examiner* — Hai Vo
(74) *Attorney, Agent, or Firm* — Thomas | Horstemeyer, LLP

(57) ABSTRACT

A multilayer sheet includes a first resin layer, a second resin layer, a particle-containing layer disposed at least between the first and second resin layers and including plural particles and gaps formed between the particles, and an intermediate layer disposed at least one selected from between the first resin layer and the particle-containing layer or between the second resin layer and the particle-containing layer, including a copolymer having a weight average molecular weight (Mw) of 300,000 or more and a molecular weight distribution, expressed as a ratio of the weight
(Continued)

average molecular weight (Mw) to a number average molecular weight (Mn), of 6.0 or less and a structural moiety derived from a crosslinking agent adapted to crosslink the copolymer, and having a crosslinking density of from more than 0 mol/m$^3$ to 450 mol/m$^3$.

10 Claims, 2 Drawing Sheets

(51) Int. Cl.
    *B32B 5/16*     (2006.01)
    *B32B 27/14*     (2006.01)
    *B32B 3/26*     (2006.01)
    *G02B 5/02*     (2006.01)
    *G02F 1/1335*     (2006.01)

(52) U.S. Cl.
    CPC ........... *G02B 1/045* (2013.01); *G02B 5/0242* (2013.01); *G02B 5/0247* (2013.01); *B32B 2264/101* (2013.01); *B32B 2264/102* (2013.01); *B32B 2457/20* (2013.01); *G02B 6/0038* (2013.01); *G02B 6/0065* (2013.01); *G02F 2001/133607* (2013.01)

(56) References Cited

FOREIGN PATENT DOCUMENTS

| | | |
|---|---|---|
| WO | WO2012054680 | 4/2012 |
| WO | WO2012105597 | 8/2012 |

OTHER PUBLICATIONS

Chinese Office Action Application No. 201480020035.X dated Aug. 1, 2016, 10 pages.

* cited by examiner

MULTILAYER SHEET

CROSS-REFERENCE TO RELATED APPLICATIONS

This application is the National Stage of International Application No. PCT/JP2014/060324, filed 9 Apr. 2014, which claims the benefit of and priority to Japanese Patent Application No. 2013-083271, filed on 11 Apr. 2013, the contents of both of which are incorporated by reference as if fully set forth herein.

TECHNICAL FIELD

The present invention relates to a multilayer sheet.

BACKGROUND ART

In recent years, multilayer sheets that include a layer containing air thereinside have been used for various purposes. Examples thereof include a backlight unit of a liquid crystal display.

A backlighting system is generally employed in liquid crystal displays, and light is irradiated from a back side of a liquid crystal display. The backlighting is mainly categorized into an edge-lit type (also referred to as "side-lit type") and a direct-backlit type. The edge-lit type backlight unit includes a light guide sheet and a light source as main components, and a multilayer sheet as described above is used as the light guide sheet.

The light guide sheet is configured to allow transmission of light therethrough. In the light guide sheet, one main surface thereof opposing to a liquid crystal unit is used as a light-emitting surface, and one lateral surface substantially perpendicular to the light-emitting surface is used as a light-incident surface. The light source is disposed so as to face the light-incident surface. Light rays emitted from the light source travel through the light guide sheet with reflections, and light rays having a relatively high NA (Numerical Aperture) with respect to the light-emitting surface are emitted from the light-emitting surface.

As a light guide sheet that includes a layer containing air thereinside, for example, there has been proposed a sheet that is configured to include a first optical layer; a second optical layer; a low-refractive index layer disposed between the first optical layer and the second optical layer, the low-refractive index layer including plural hollow particles and having a lower refractive index than those of the first optical layer and the second optical layer; and an intermediate layer disposed between the first optical layer and the low-refractive index layer (see, for example, International Publication (WO) No. 2012/105597).

In the sheet disclosed in WO 2012/105597, when light falls upon the first optical layer along a plane direction of the sheet, the light that has entered thereinto travels mainly through the first optical layer. In the low-refractive index layer, since the particles themselves have cavities and gaps are formed between the particles, the light that travels through the first optical layer is reflected at the boundary of the first optical layer and the low-refractive index layer, which results in the reduced entry of the light into the low-refractive index layer. Accordingly, since the sheet disclosed in WO 2012/105597 allows appropriate transmission of light, favorable luminance can be obtained even at a place that is distant from the light-incident surface.

In addition, in the sheet disclosed in WO 2012/10559, the intermediate layer is disposed between the first optical layer and the low-refractive index layer, so that favorable interlayer adhesion properties can be obtained.

SUMMARY OF INVENTION

The sheet disclosed in WO 2012/105597 is produced as follows. A sheet for forming a low-refractive index layer in which a low-refractive index layer is formed on a resin sheet that serves as the second optical layer, and a sheet for forming an intermediate layer in which an intermediate layer is formed on a resin sheet that serves as the first optical layer, are bonded together such that the low-refractive index layer and the intermediate layer face each other, and then the resultant is subjected to heat lamination.

In the sheet disclosed in WO 2012/105597, when a large impact or stress is applied from an external source, as in the heat lamination when producing the sheet, a resin included in the intermediate layer sometimes penetrates the gaps formed between the particles in the low-refractive index layer. When the gaps in the low-refractive index layer are reduced due to the penetration of the resin, the refractive index is increased, as a result of which desired optical characteristics (such as luminance and light-guiding performance) cannot be obtained.

On the other hand, for example, in a case in which the hardness of the resin is increased in order to prevent the penetration of the resin into the gaps in the low-refractive index layer, the adhesion property between the first optical layer and the intermediate layer deteriorates.

The present invention has been accomplished in view of the above circumstances. An object of the present invention is to provide a multilayer sheet having favorable interlayer adhesion properties in which the reduction of in-layer gaps due to an impact or stress from an external source is prevented.

Specific means for achieving the object include the followings:

<1> A multilayer sheet, including:
a first resin layer;
a second resin layer;
a particle-containing layer disposed at least between the first resin layer and the second resin layer, the particle-containing layer including a plurality of particles and gaps formed between the particles; and
an intermediate layer disposed at at least one selected from (i) between the first resin layer and the particle-containing layer or (ii) between the second resin layer and the particle-containing layer,
the intermediate layer including a copolymer having a weight average molecular weight (Mw) of 300,000 or more and having a molecular weight distribution (Mw/Mn), expressed as a ratio of a weight average molecular weight (Mw) to a number average molecular weight (Mn), of 6.0 or less, and a structural moiety derived from a crosslinking agent adapted to crosslink the copolymer, and
the intermediate layer having a crosslinking density of from more than 0 mol/m$^3$ to 450 mol/m$^3$.

<2> The multilayer sheet according to <1>, in which the copolymer is a (meth)acrylic copolymer including:
a structural unit A derived from (meth)acrylate; and
a structural unit B derived from a monomer having at least one functional group selected from a hydroxy group, a carboxy group, a phosphate group, a cyano group, an epoxy group, or an amino group.

<3> The multilayer sheet according to <1> or <2>, in which each of the first resin layer and the second resin layer independently includes at least one selected from a carbonate resin, a (meth)acrylic resin, an ester resin, a styrene resin, a vinyl chloride resin, a fluorine resin, an olefin resin, a cellulose acetate resin, a silicone resin, an amide resin, an epoxy resin, an acrylonitrile resin, a urethane resin, an imide resin, or a polyether sulfone.

<4> The multilayer sheet according to any one of <1> to <3>, in which the particles have an average particle diameter of from 5 nm to 300 nm.

<5> The multilayer sheet according to any one of <1> to <4>, in which the particles are hollow particles.

<6> The multilayer sheet according to any one of <1> to <5>, in which the intermediate layer has a storage modulus of from 60,000 Pa to 280,000 Pa.

<7> The multilayer sheet according to any one of <2> to <6>, in which a content of the structural unit A in the (meth)acrylic copolymer is from 50% by mole to 99% by mole with respect to a total mole number of monomer-derived structural units in the (meth)acrylic copolymer.

<8> The multilayer sheet according to any one of <2> to <7>, in which a content of the structural unit B in the (meth)acrylic copolymer is from 1% by mole to 50% by mole with respect to a total mole number of monomer-derived structural units in the (meth)acrylic copolymer.

<9> The multilayer sheet according to any one of <1> to <8>, in which at least one layer selected from the first resin layer or the second resin layer is a prism layer or a lens layer.

In the present specification, a numerical range defined using "to" indicates a range including numerical values given before and after "to" as a minimum value and a maximum value.

In the present specification, when the composition includes plural substances corresponding to a given ingredient, the amount of the ingredient means the total amount of the substances contained in the composition, unless otherwise specified.

In the present specification, "(meth)acrylate" means any of acrylate, methacrylate, or both; and "(meth)acryl" means any of acryl, methacryl, or both.

According to the invention, there can be provided a multilayer sheet having favorable interlayer adhesion properties in which the reduction of in-layer gaps due to an impact or stress from an external source is prevented.

DESCRIPTION OF EMBODIMENTS

Figure 1:
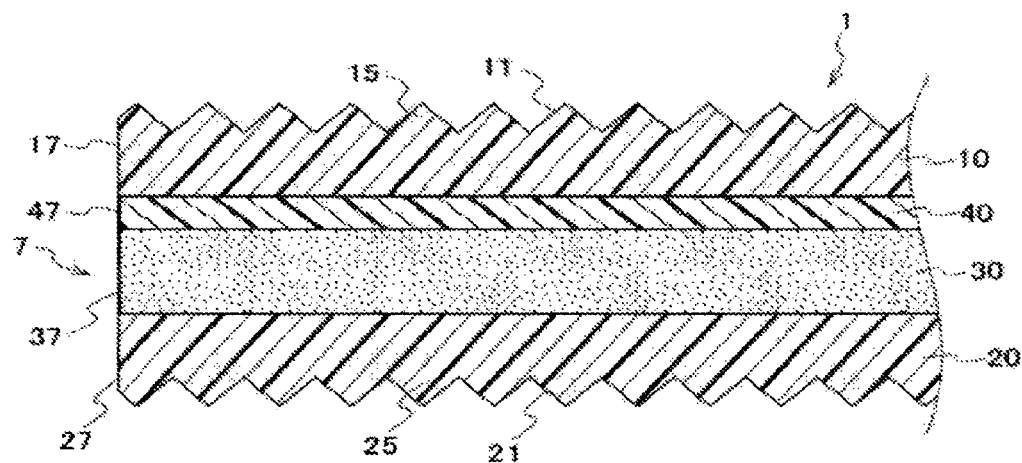
FIG. 1 is a sectional view of a multilayer sheet (a light guide sheet) according to a first embodiment of the invention.

Hereinbelow, specific embodiments of the invention are described in detail. However, the invention is not limited to these embodiments and can be put into practice after appropriate modifications as long as the gist of the invention is retained.

Multilayer Sheet

A multilayer sheet according to the invention is characterized in that it includes a first resin layer; a second resin layer; a particle-containing layer disposed at least between the first resin layer and the second resin layer, the particle-containing layer including plural particles and gaps between the particles; and an intermediate layer disposed at at least one selected from (i) between the first resin layer and the particle-containing layer or (ii) between the second resin layer and the particle-containing layer, the intermediate layer including a copolymer having a weight average molecular weight (Mw) of 300,000 or more and having a molecular weight distribution (Mw/Mn), expressed as a ratio of a weight average molecular weight to a number average molecular weight (Mn), of 6.0 or less, and a structural moiety derived from a crosslinking agent adapted to crosslink the copolymer, and the intermediate layer having a crosslinking density of from more than 0 mol/m$^3$ to 450 mol/m$^3$.

Conventionally, in light guide sheets (light guide plates), an attempt has been made, by providing a low-refractive index layer containing cavities or gaps formed by plural particles between a first optical layer and a second optical layer such that light that travels through the first optical layer is reflected at a boundary between the first optical layer and the low-refractive index layer, to reduce the entry of the light into the lower refractive index layer. Due to the reduction in the entry of the light into the low-refractive index layer, light is appropriately transmitted. Therefore, favorable luminance can be obtained even at a place that is distant from a light-incident surface. However, since adhesion force of the low-refractive index layer to the first optical layer is low in a case in which the low-refractive index layer contains the gaps therein, an intermediate layer is provided between the first optical layer and the low-refractive index layer.

However, when an impact or stress from an external source is applied to the intermediate layer, a resin included in the intermediate layer sometimes penetrates the gaps formed between the particles in the low-refractive index layer. The penetration of the resin reduces the gaps in the low-refractive index layer, and thus leads to an increase in the refractive index, as a result of which desired optical characteristics (such as luminance and light-guiding performance) cannot be obtained. The hardness of the resin could be increased in order to prevent the penetration of the resin into the gaps in the low-refractive index layer, but in such a case the adhesion property between the first optical layer and the intermediate layer deteriorates.

In the invention, it is significant that both favorable interlayer adhesion properties and the prevention of the reduction in the in-layer gaps can be achieved by controlling a structure and physical properties of the intermediate layer.

In the present description, the description is given while mainly focusing on a case in which the multilayer sheet according to the invention is used for an optical purpose (for example, a light guide sheet). However, the use application of the multilayer sheet according to the invention is not limited thereto. According to the multilayer sheet of the invention, even in a case in which an impact or stress is applied from an external source when producing or using the sheet, the adjacent resin hardly penetrates the gaps formed between the particles. Accordingly, the multilayer sheet according to the invention can be suitably used as a resin sheet whose function is achieved due to the gaps present in the layer, such as a heat insulating sheet, a low-dielectric constant sheet, or an electrically insulating sheet.

FIG. 1 depicts a sectional view of a light guide sheet according to a first embodiment of the invention.

In the present specification, respective drawings shown below (FIGS. 1 to 3) are schematic diagrams in which dimensions and shapes of respective portions are exaggerated as necessary for easier understanding.

FIG. 1 is a diagram illustrating a sectional structure of the light guide sheet according to the first embodiment of the invention.

As illustrated in FIG. 1, a light guide sheet 1 according to the first embodiment includes, as main components, a first resin layer 10, a second resin layer 20, a particle-containing layer 30 disposed on the second resin layer 20, and an intermediate layer 40 disposed between the first resin layer 10 and the particle-containing layer 30. In the light guide sheet 1 according to the first embodiment, a surface 11 on the opposite side of the first resin layer 10 with respect to the intermediate layer 40 is used as a light-emitting surface, and one lateral face 7 of the light guide sheet 1 is used as a light-incident surface. The lateral face 7 of the light guide sheet is a surface including one lateral face 17 of the first resin layer 10, one lateral face 47 of the intermediate layer 40, one lateral face 37 of the particle-containing layer 30, and one lateral face 27 of the second resin layer 20.

In other words, the light guide sheet 1 according to the first embodiment has a function as a light diffusion sheet that transmits light entering from the light-incident surface along the plane direction, and further emits at least a part of the light that has traveled along the plane direction from the light-emitting surface.

The first resin layer 10 includes, as a component thereof, a carbonate resin, which is a light transmissive material. The first resin layer 10 is disposed so as to cover the entirety of the plane direction of the light guide sheet 1, and the lateral face 17 of the first resin layer 10 is used as a part of the light-incident surface. In addition, in the first resin layer 10, plural prisms 15 are formed on the surface 11 side as the light-emitting face, and thus the light-emitting surface is formed into a prism surface having a concave-convex shape. The shape of the prisms 15 is not particularly limited, and it is preferable that at least grooves parallel to the longitudinal direction of the lateral face 17 are formed by the respective prisms 15. As described above, since the lateral face 17 is a part of the light-incident surface, the light that has entered from the light-incident surface tends to travel perpendicularly to the longitudinal direction of the lateral face 17. Therefore, the direction of the grooves formed by the respective prisms 15 and the transmission direction of the light can be made substantially perpendicular to each other by forming the grooves in the manner described above, and thus the light that has entered from the light-incident surface can be more easily emitted from the light-emitting surface.

The second resin layer 20 includes, as a component thereof, a carbonate resin, which is a light transmissive material, as with the case of the first resin layer 10. The second resin layer 20 is disposed so as to cover the entirety of the plane direction at the side opposite to the first resin layer 10 in the light guide sheet 1. The lateral face 27 of the second resin layer 20 is used as a part of the light-incident surface. Furthermore, a surface 21 of the second resin layer 20 on a side opposite to the particle-containing layer 30 side is used as a light-reflecting surface. Plural prisms 25 are formed on the light-reflecting surface side of the second resin layer 20, and thus the light-reflecting surface is a prism surface having a concave and convex shape. The shape of the prisms 25 is not particularly limited, and it is preferable that at least grooves parallel to the longitudinal direction of the lateral face 27 are formed by the respective prisms 25. The prisms 25 may have a shape that is in a plane-symmetric relationship to the prisms 15 disposed at the opposite side of the light guide sheet 1 or may have a shape different from the shape of the prisms 15.

The prisms 25 each have a shape that allows dispersion, reflection, and total reflection of light. Examples of the prisms 25 having such a shape include V-shaped linear prisms, U-shaped linear prisms, triangular pyramid prisms, and quadrangular pyramid prisms.

The refractive index of the second resin layer 20 is not particularly limited and is set to be, for example, similar to the refractive index of the first resin layer 10.

Figure 2:
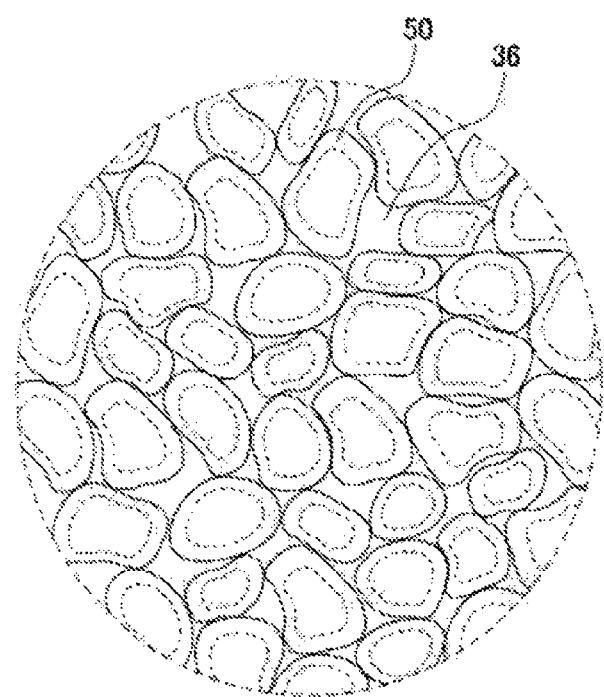
FIG. 2 is a partially enlarged sectional view obtained by partially enlarging a particle-containing layer in the multilayer sheet (the light guide sheet) according to the first embodiment of the invention.

FIG. 2 is a partially enlarged sectional view obtained by enlarging a part of the particle-containing layer 30 illustrated in FIG. 1. As illustrated in FIG. 2, the particle-containing layer 30 includes plural hollow particles 50.

Figure 3:
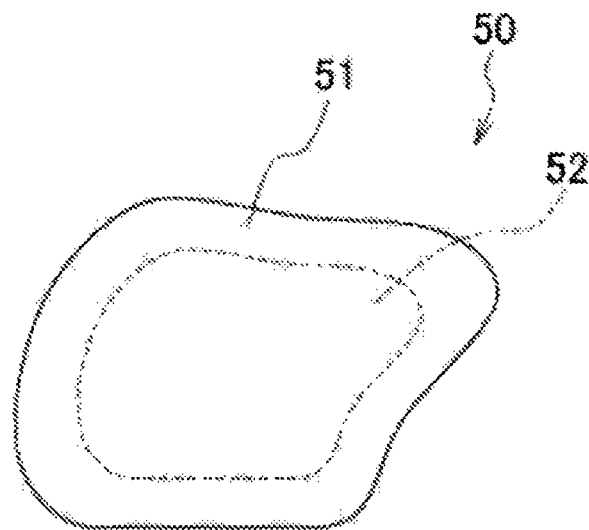
FIG. 3 is a sectional view of a particle included in the particle-containing layer in the multilayer sheet (the light guide sheet) according to the first embodiment of the invention.

FIG. 3 is an enlarged view of one of the hollow particles 50. As illustrated in FIG. 3, in the hollow particle 50 includes a shell 51, and a cavity 52 surrounded by the shell 51 is formed in the hollow particle 50. The shell 51 mainly includes $SiO_2$ that is a light transmissive material.

As illustrated in FIG. 2, in the particle-containing layer 30, the hollow particles 50 illustrated in FIG. 3 directly contact each other and are bound to one another. In other words, in the particle-containing layer 30, there is no binder for the binding of the hollow particles 50 to one another filled between the hollow particles 50. The bonding between the hollow particles 50 seems to occur due to the cohesive force between the hollow particles 50. In this manner, since there is no binder for the binding of the hollow particles 50 to one another filled between the hollow particles 50 and the hollow particles 50 directly contact each other and are bound to one another, the gaps 36 are formed between the hollow particles 50.

The intermediate layer 40 is disposed at the entirety of the region between the first resin layer 10 and the particle-containing layer 30. The intermediate layer 40 includes a specific copolymer and a structural moiety that is derived from a crosslinking agent adapted to crosslink the specific copolymer, and has a specific crosslinking density. In the light guide sheet 1 according to the first embodiment, the intermediate layer 40 includes, as the specific copolymer, an acrylic copolymer having a polymerization average molecular weight (Mw) of 1,750,000 and having a molecular weight distribution (Mw/Mn) of 2.6. In addition, the intermediate layer 40 has a crosslinking density of 6.5 $mol/m^3$.

The light guide sheet 1 including the first resin layer 10, the second resin layer 20, the particle-containing layer 30, and the intermediate layer 40 thus formed has a function as a light diffusion sheet, as described above. Specifically, a light source (not shown) formed of an LED (light-emitting diode) or the like is arranged so as to face the light-incident surface. The light emitted from the light source enters from the light-incident surface. Among the light rays, the light rays that have entered into the first resin layer 10 travel through mainly the first resin layer 10. Specifically, the light rays travel through the first resin layer 10 with reflection at the light-emitting surface and the boundary of the intermediate layer 40 and the particle-containing layer 30, and light rays having a high NA (numerical aperture) with respect to the light-emitting surface are emitted from the light-emitting surface.

Furthermore, the light rays having a high NA with respect to the boundary between the intermediate layer 40 and the particle-containing layer 30 enter into the particle-containing layer 30 from the first resin layer 10, and further enter into the second resin layer 20 from the particle-containing layer 30. At least some of the light rays that have entered into the second resin layer 20 are reflected at the light-reflecting surface. In other words, the light rays having a low NA with respect to the light-reflecting surface of the second resin layer 20 are reflected by the light-reflecting surface, and enter again into the first resin layer 10 from the particle-containing layer 30. On the other hand, the light rays having a high NA with respect to the light-reflecting surface pass the light-reflecting surface and are emitted from the light guide sheet 1. The light rays that enter into the first resin layer 10 travel again through the first resin layer 10.

As described above, in the light guide sheet 1 according to the first embodiment of the invention, the particle-containing layer 30 includes the plural hollow particles 50 and thus the refractive index thereof can be reduced as a whole due to the cavities present in the hollow particles 50. In addition, in the light guide sheet 1 according to the first embodiment of the invention, the hollow particles 50 directly contact each other and are bound to one another, to form the gaps 36 between the hollow particles 50. Due to the presence of such gaps, the refractive index of the particle-containing layer 30 can be further reduced. Furthermore, since the binder generally tends to exhibit a high refractive index, the refractive index of the particle-containing layer 30 can be further reduced appropriately in a case in which no binder is used in the particle-containing layer 30, as in the light guide sheet 1 according to the first embodiment of the invention.

Furthermore, since the light guide sheet 1 according to the first embodiment of the invention includes the intermediate layer 40, the first resin layer 10 and the particle-containing layer 30 can be favorably and tightly adhered to each other, and also, in a case in which an impact or stress is applied from an external source, direct propagation of the impact or stress to the particle-containing layer 30 can be inhibited. Additionally, the intermediate layer 40 includes a specific copolymer and a structural moiety derived from a crosslinking agent adapted to crosslink the copolymer, and has a specific crosslinking density. Accordingly, even in a case in which an impact or stress is applied from an external source, the resin forming the intermediate layer 40 hardly penetrates the gaps formed between the particles in the particle-containing layer 30. Therefore, an increase in the refractive index due to the reduction of the gaps in the particle-containing layer 30 hardly occurs.

In the light guide sheet 1 according to the first embodiment, the particle-containing layer 30 is formed by the binding between the hollow particles 50. However, the light guide sheet 1 may be formed by mutual binding of particles having no cavities thereinside.

In the light guide sheet 1 according to the first embodiment, the intermediate layer 40 is disposed between the first resin layer 10 and the particle-containing layer 30. However, the intermediate layer 40 may be disposed between the second resin layer 20 and the particle-containing layer 30, or may be disposed both between the first resin layer 10 and the particle-containing layer 30 and between the second resin layer 20 and the particle-containing layer 30.

In the light guide sheet 1 according to the first embodiment, the plural prisms 15 are formed on the light-reflecting surface side of the first resin layer 10, and also the plural prisms 25 are formed on the light-reflecting surface side of the second resin layer 20. However, instead of the prisms, plural lenses, such as microlenses or lenticular lenses, may be formed on the light-reflecting surface side of the first resin layer 10 and the light-reflecting surface side of the second resin layer 20.

Hereinafter, respective layers included in the multilayer sheet according to the invention are described.

First Resin Layer

The material for forming the first resin layer is not particularly limited. For example, in a case in which the multilayer sheet according to the invention is used for optical purposes, the first resin layer preferably includes, as a component thereof, a light transmissive material. The light transmissive material is a material having a total light transmittance of preferably 30% or more, more preferably 50% or more, and still more preferably 70% or more. In a case in which the first resin layer includes, as a component thereof, a material having high total light transmittance, light can be emitted while further suppressing the loss of entering light, and thus light use efficiency can be improved.

The total light transmittance is a value that is measured using a light source A in accordance with JIS K7105. The light source A is one of the specifications for standard light sources defined by CIE (Commission Internationale de l'Eclairage), and is a light emitted from a tungsten light bulb and has a color temperature of 2856 Kelvin.

Examples of the light transmissive material include (meth)acrylic resins, carbonate resins, ester resins (such as polyethylene terephthalate, polyethylene naphthalene, and polyacrylates), styrene resins, vinyl chloride resins, fluorine resins, olefin resins (including cycloolefin resins), cellulose acetate resins, silicone resins, amide resins, epoxy resins, acrylonitrile resins, urethane resins, imide resins, and polyether sulfones.

Among these, the light transmissive material in the invention is preferably one selected from (meth)acrylic resins, carbonate resins, ester resins, and olefin resins, and more preferably one selected from carbonate resins, from the viewpoints of high total light transmittance, high refractive index, easy thermoforming, low cost, and availability.

In the invention, a film or sheet formed using single kind selected from the light transmissive materials described above, or two or more kinds selected from the light transmissive materials, by a film-forming method such as extrusion, casting, T-die extrusion, or inflation, can be suitably used as the first resin layer. Alternatively, the first resin layer may be a product commercially available on the market.

The thickness of the first resin layer is preferably as thin as possible within a range that satisfies performance required for the use application of the multilayer sheet according to the invention, from the viewpoints of lightweight and thin properties, low cost, and light transmittance. In a case in which the multilayer sheet according to the invention is used as a light guide sheet, the thickness of the first resin layer is preferably from 20 μm to 1000 μm, and more preferably from 50 μm to 600 μm, from the viewpoints of handleability of the light guide sheet in manufacturing of the sheet and of securing a thickness for forming prisms or lenses having a desired height on a surface of the first resin layer.

Second Resin Layer

The material for forming the second resin layer is not particularly limited. For example, in a case in which the multilayer sheet according to the invention is used for optical purposes, the second resin layer preferably includes, as a component thereof, a light transmissive material, similarly to the second resin layer. The light transmissive material for forming the second resin layer has the same definition as the light transmissive material for forming the first resin layer described above, and has the same preferable examples as those for the material of the first resin layer. Furthermore, similarly to the first resin layer described above, the second resin layer may be a film or a sheet formed using single kind selected from the above exemplified light transmissive materials, or two or more kinds selected from the above exemplified light transmissive materials. Alternatively, the second resin layer may be a product commercially available on the market.

The thickness of second resin layer is preferably as thin as possible within a range that satisfies performance required for the use application of the multilayer sheet according to the invention, from the viewpoints of lightweight and thin properties, low cost, and light transmitting properties. In a case in which the multilayer sheet according to the invention is used as a light guide sheet, the thickness of the second resin layer is preferably from 20 μm to 1000 μm, and more preferably from 50 μm to 600 μm, from the viewpoints of handleability of the light guide sheet in manufacturing of the sheet and of securing a thickness for forming prisms or lenses having a desired height on a surface of the second resin layer.

Particle-Containing Layer

The particle-containing layer according to the invention is disposed at least between the first resin layer and the second resin layer and includes plural particles and gaps formed between the particles.

The material for forming the particles included in the particle-containing layer is not particularly limited, and may be an organic material or an inorganic material. Since the multilayer sheet according to the invention is produced by pressure forming, the material for forming the particles is preferably an inorganic material when considering resistance against pressure and temperature during the pressure forming.

Examples of the organic material for forming the particles include the same materials as the resins for forming the first resin layer or the second resin layer described above.

Examples of the inorganic material for forming the particles include silica and glass.

Examples of commercially available products of the inorganic material for forming the particles include EPOSTAR, SEAHOSTER, and SOLIOSTAR (all trade names, manufactured by Nippon Shokubai Co., Ltd.); OPTBEADS (trade name, manufactured by Nissan Chemical Industries, Ltd.); ART PEARL (trade name, manufactured by Negami Chemical Industrial Co., Ltd.; DAIMICKBEAZ (trade name, manufactured by Dainichiseika Color & Chemicals Mfg. Co., Ltd.; GANZPEARL (trade name, manufactured by Ganz Chemical Co., Ltd.); TECHPOLYMER (trade name, manufactured by Sekisui Plastics Co., Ltd.); and CHEMISNOW (trade name, manufactured by Soken Chemical & Engineering Co., Ltd).

The particle included in the particle-containing layer is preferably a hollow particle.

In the invention, "hollow particle" means a particle in which a cavity surrounded by an outer shell is formed. The inside of the cavity may be in a vacuum state, or may be filled with a gas.

In the particle-containing layer that includes the hollow particles, since gaps are formed between the particles, and the particles themselves also have the cavities, the refractive index of the particle-containing layer as a whole can be further reduced. Accordingly, in a case in which the multilayer sheet according to the invention is used as a light guide sheet, the particles included in the particle-containing layer are preferably hollow particles.

Also in a case in which the multilayer sheet according to the invention is used as a heat insulating sheet, the particles included in the particle-containing layer are preferably hollow particles. This enables the layer to contain a larger amount of air, whereby heat insulating properties can be further improved.

The hollow particles preferably include, as a component thereof, a silica-based inorganic oxide. As used herein, the "silica-based inorganic oxide" means silica or a complex oxide made of silica and an inorganic oxide other than silica.

Examples of the inorganic oxide other than silica include $Al_2O_3$, $B_2O_3$, $TiO_2$, $ZrO_2$, $SnO_2$, $Ce_2O_3$, $P_2O_5$, $Sb_2O_3$, $MoO_3$, $ZnO_2$, $TiO_2$—$Al_2O_3$, and $ZrO_2$—$Al_2O_3$.

The details of the hollow particles are described in Japanese Patent Application Laid-Open (JP-A) No. H07-133105 and Japanese Patent Application Laid-Open (JP-A) No. 2001-233611.

Examples of commercially available products of the hollow particles include SILINAX (registered trademark, manufactured by Nittetsu Mining Co., Ltd.), and SLURIA (registered trademark, manufactured by JGC C&C).

The shape of the particles is not particularly limited and may be a spherical shape or an amorphous shape. In terms of optical purposes, the particles have preferably a shape that exhibits low-refractive index.

The average particle diameter of the particles is not particularly limited. For example, in a case in which the multilayer sheet according to the invention is used for optical purposes, the average particle diameter thereof is preferably smaller than the wavelength of the light that enters into the multilayer sheet, i.e., the light that travels through the first resin layer, more preferably smaller than the half, still more preferably smaller than the quarter, of the wavelength of the light that travels through the first resin layer, from the viewpoint of suppressing the irregular reflection of light in the particle-containing layer to suppress unintended emission of light rays from the light-emitting surface.

Specifically, the average particle diameter of the particles is preferably from 5 nm to 300 nm, more preferably from 30 nm to 300 nm, and still more preferably from 30 nm to 120 nm. In a case in which the average particle diameter of the particles is 5 nm or more, the particles can retain their own strength sufficiently. In the case of the hollow particles, the average particle diameter of less than 5 nm is not preferable since it is technically difficult to manufacture such particles. In a case in which the average particle diameter of the particles is 300 nm or less, light can be sufficiently transmitted and the particles can be more favorably dispersed in an organic solvent.

In a case in which the particles are hollow particles formed using silica, the average particle diameter of the particles is preferably from 30 nm to 120 nm from the view point of allowing the particles to more strongly bind to one another in the particle-containing layer.

The particle size distribution of the particles is preferably in a range of from 90% to 110% of the average particle diameter. In a case in which the particle size distribution of the particles is within the above range, particle sizes of the particles are substantially uniform and thus the strength of the particle-containing layer can be further improved.

The average particle diameter and the particle size distribution of the particles are measured by a dynamic light scattering method.

The proportion of the gaps formed between the particles in the particle-containing layer is preferably as high as possible from the viewpoint of reducing the refractive index of the particle-containing layer, and is preferably from 26% to 50% from the viewpoint of ensuring the strength of the particle-containing layer.

In a case in which the particles included in the particle-containing layer are hollow particles, the average proportion of the cavity in the particles is preferably a high as possible from the viewpoint of reducing the refractive index of the particle-containing layer, and is preferably from 10% to 60% from the viewpoint of ensuring the strength of the particles.

Intermediate Layer

The intermediate layer in the invention includes a copolymer having a weight average molecular weight (Mw) of 300,000 or more and having a molecular weight distribution (Mw/Mn), expressed as a ratio of a weight average molecular weight (Mw) to a number average molecular weight (Mn), of 6.0 or less, and a structural moiety derived from a crosslinking agent adapted to crosslink the copolymer, and has a crosslinking density of from more than 0 mol/m$^3$ to 450 mol/m$^3$.

In the invention, the intermediate layer can prevent the penetration of the resin included in the intermediate layer into the gaps formed between the particles in the particle-containing layer, while the particle-containing layer and the first resin layer are favorably and tightly adhered via the intermediate layer. When the gaps in the particle-containing layer is reduced due to the penetration of the resin, the refractive index of the particle-containing layer is increased, as a result of which desired optical characteristics (such as luminance and light-guiding performance) cannot be obtained. In a case in which the multilayer sheet according to the invention is used as a heat insulating sheet, the penetration of the resin would cause a deterioration of heat insulating properties.

The copolymer included in the intermediate layer has a weight average molecular amount (Mw) of 300,000 or more, and has a molecular weight distribution (Mw/Mn) of 6.0 or less. In a case in which the weight average molecular weight (Mw) of the copolymer is less than 300,000, the copolymer easily penetrates the gaps in the particle-containing layer, whereby, for example, the refractive index of the particle-containing layer is increased. In a case in which the molecular weight distribution (Mw/Mn) of the copolymer is more than 6.0, a copolymer having a low molecular weight that easily penetrates the gaps in the particle-containing layer would be included in such a distribution range, as a result of which, for example, the refractive index of the particle-containing layer is more likely to increase.

The lower limit value of the weight average molecular weight (Mw) of the copolymer is preferably 1200,000 or more. The upper limit value of the weight average molecular weight (Mw) of the copolymer is preferably 5,000,000 or less, and more preferably 2,000,000 or less, from the viewpoint of ease of production and handling.

The upper limit value of the molecular weight distribution (Mw/Mn) of the copolymer is preferably 4.5 or less. The lower limit value of the molecular weight distribution (Mw/Mn) of the copolymer is preferably 1 or more.

The weight average molecular weight (Mw) and the molecular weight distribution (Mw/Mn), expressed as the ratio of the weight average molecular weight (Mw) to a number average molecular weight (Mn), are values that are calculated based on calibration with polystyrene standards using gel permeation chromatography (GPC) described below.

Conditions

Measurement apparatus: high-speed GPC (HLC-8220, manufactured by Tosoh Corporation)

Detector: differential refractive index meter (RI) (integrated into HLC-8220, manufactured by Tosoh Corporation)

Column: two TSK-GEL SUPER MULTIPORE HZ-H (manufactured by Tosoh Corporation) columns connected in series Column size: 4.6 mm ID×15 cm Column temperature: 40° C.

Eluent: tetrahydrofuran

Sample concentration: 90 mg/mL

Injection volume: 10 µL

Flow rate: 0.35 mL/min

The copolymer included in the intermediate layer is not particularly limited as long as the copolymer has the weight average molecular weight (Mw) and the molecular weight distribution (Mw/Mn) as described above. In a case in which the multilayer sheet according to the invention is used for optical purposes, a copolymer that exhibits light transmitting properties and has adhesive properties is preferable. Examples of such a copolymer include (meth)acrylic copolymers, isopropylene copolymers, ester copolymers, silicone copolymers, and urethane copolymers. Among these, preferable examples of the copolymer included in the intermediate layer include (meth)acrylic copolymers, from the viewpoints of the degree of freedom associated with denaturation, solubility in a solvent, heat resistance, light resistance, adhesiveness to the first resin layer, and transparency.

Among (meth)acrylic copolymers, a (meth)acrylic copolymer that includes a structural unit A derived from a (meth)acrylate and a structural unit B derived from a monomer having at least one functional group selected from a hydroxy group, a carboxy group, a phosphate group, a cyano group, an epoxy group, or an amino group is preferable, from the viewpoint of ensuring a crosslinking point for causing crosslinking reaction.

The (meth)acrylic copolymer described above is a copolymer that can be obtained by copolymerizing, as monomer components, at least a (meth)acrylate monomer with a monomer having at least one functional group selected from a hydroxy group, carboxy a group, a phosphate group, a cyano group, an epoxy group, or an amino group.

As the (meth)acrylate monomer, for example, a (meth)acrylic acid alkyl ester monomer can be suitably used for the copolymerization reaction.

Specific examples of the (meth)acrylic acid alkyl ester monomer include ethyl(meth)acrylate, n-propyl(meth)acrylate, i-propyl(meth)acrylate, n-butyl(meth)acrylate, t-butyl(meth)acrylate, i-butyl(meth)acrylate, n-hexyl(meth)acrylate, cyclohexyl(meth)acrylate, 2-ethylhexyl(meth)acrylate, n-octyl(meth)acrylate, isooctyl(meth)acrylate, n-nonyl(meth)acrylate, isononyl(meth)acrylate, tridecyl(meth)acrylate, stearyl(meth)acrylate, and oleyl(meth)acrylate (preferably, methyl acrylate); and methacrylic acid esters (preferably, methyl methacrylate). Among these monomers, the (meth)acrylic acid alkyl ester monomer is preferably a acrylate monomer selected from ethyl acrylate, n-propyl acrylate, i-propyl acrylate, n-butyl acrylate, i-butyl acrylate, n-hexyl acrylate, 2-ethylhexyl acrylate, n-octyl acrylate, isooctyl acrylate, n-nonyl acrylate, or isononyl acrylate, and more preferably n-butyl acrylate, from the viewpoints of adhesive properties and solubility in a solvent.

The (meth)acrylate monomers may be used singly, or in combination of two or more thereof.

The content of the structural unit A is preferably from 50% by mole to 99% by mole, more preferably from 60% by mole to 97% by mole, and still more preferably from 70% by mole to 95% by mole, with respect to a total mole number of monomer-derived structural units in the (meth)acrylic copolymer. In a case in which the content of the structural unit A is within the above range, the copolymer has excellent solubility in a solvent and high adhesion strength can be obtained.

The monomer having a hydroxy group (hereinafter also referred to as "hydroxy group-containing monomer") is not particularly limited as long as the monomer has a hydroxy group. Examples of the hydroxy group-containing monomer include hydroxyalkyl (meth)acrylates such as 2-hydroxyethyl acrylate (2HEA), 2-hydroxypropyl acrylate, 2-hydroxyethyl methacrylate, 2-hydroxypropyl methacrylate, 4-hydroxybutyl acrylate, and 1,4-cyclohexane dimethanol monoacrylate; allyl alcohol, methallyl alcohol, polyethylene glycol monoacrylate, and polyethylene glycol monomethacrylate. Among these monomers, the hydroxy group-containing monomer is preferably 2-hydroxyethyl acrylate (2HEA) in terms of solubility in a solvent and low cost.

The monomer having a carboxy group (hereinafter also referred to as "carboxy group-containing monomer") is not particularly limited as long as the monomer has a carboxy group. Examples of the carboxy group-containing monomer include $\alpha,\beta$-unsaturated mono- or di-carboxylic acids having from 3 to 5 carbon atoms, such as acrylic acid, methacrylic acid, $\omega$-carboxy polycaprolactone monoacrylate, itaconic acid, maleic acid, fumaric acid, crotonic acid, citraconic acid, or maleic anhydride. Among these monomers, the carboxy group-containing monomer is preferably a monomer selected from acrylic acid or methacrylic acid, and more preferably acrylic acid, from the viewpoint of high controllability of the weight average molecular weight (Mw) of the (meth)acrylic copolymer.

The monomer having a phosphate group (hereinafter also referred to as "phosphate group-containing monomer") is not particularly limited as long as the monomer has a phosphate group. Examples of the phosphate group-containing monomer include PHOSMER M, PHOSMER CL, PHOSMER PE, PHOSMER MH and PHOSMER PP (all trade names) manufactured by Uni-Chemical Co., Ltd. Among these monomers, the phosphate group-containing monomer is preferably PHOSMER M in terms of low viscosity and high handleability.

The monomer having a cyano group (hereinafter also referred to as "cyano group-containing monomer") is not particularly limited as long as the monomer has a cyano group. Examples of the cyano group-containing monomer include acrylonitrile, methyl cyanoacrylate, and ethyl cyanoacrylate. Among these monomers, the cyano group-containing monomer is preferably acrylonitrile in terms of high handleability.

The monomer having an epoxy group (hereinafter also referred to as "epoxy group-containing monomer") is not particularly limited as long as the monomer has an epoxy group. Examples of the epoxy group-containing monomer include glycidyl(meth)acrylate and 4-hydroxybutyl acrylate glycidylether.

The monomer having an amino group (hereinafter also referred to as "amino group-containing monomer") is not particularly limited as long as the monomer has an amino group. Examples of the amino group-containing monomer include aminoethyl(meth)acrylate, N,N-dimethyl aminoethyl(meth)acrylate, and N,N-diethyl aminoethyl(meth)acrylate.

In the invention, among the above-described monomers, the structural unit B is preferably derived from a monomer selected from hydroxy group-containing monomers (preferably, 2-hydroxy ethyl acrylate (2HEA)) and carboxy group-containing monomers (preferably, acrylic acid), from the viewpoint of reactivity with a crosslinking agent, low cost, ease of copolymerization, and non-coloring properties.

The monomers described above may be used singly or in combination of two or more thereof. In addition, while monomers having one functional group selected from a hydroxy group, a carboxy group, a phosphate group, a cyano group, an epoxy group, or an amino group are listed as specific examples in the above, the monomer in the invention is not limited thereto. Monomers having two or more functional groups each selected from a hydroxy group, a carboxy group, a phosphate group, a cyano group, an epoxy group, or an amino group may also be used.

The content of the structural unit B is preferably from 1% by mole to 50% by mole, more preferably from 3% by mole to 40% by mole, and still more preferably from 5% by mole to 30% by mole, with respect to a total mole number of monomer-derived structural units in the (meth)acrylic copolymer. In a case in which the content of the structural unit B is within the above range, the resin included in the intermediate layer forms a three-dimensional crosslinking structure by the reaction between the (meth)acrylic copolymer and a crosslinking agent, as a result of which the penetration of the resin into the gaps between the particles present in the particle-containing layer can be inhibited and also gelation in polymerization can be suppressed.

In the (meth)acrylic copolymer, if necessary, a comonomer as an additional monomer component other than those described above may further be copolymerized.

The comonomer is a monomer that is different from the (meth)acrylate monomer, the hydroxy group-containing monomer, the carboxy group-containing monomer, the phosphate group-containing monomer, the cyano group-containing monomer, the epoxy group-containing monomer, and the amino group-containing monomer, and that can be copolymerized with the (meth)acrylate monomer, the hydroxy group-containing monomer, the carboxy group-containing monomer, the phosphate group-containing monomer, the cyano group-containing monomer, the epoxy group-containing monomer, or the amino group-containing monomer.

The comonomer can be copolymerized to the extent that the advantageous effect according to the invention is not impaired. In the case of copolymerizing the comonomer, the content of the comonomer is preferably from more than 0% by mole to 30% by mole with respect to the total mole number of monomer-derived structural units in the (meth) acrylic copolymer.

The intermediate layer in the invention includes the above copolymer and a structural moiety derived from a crosslinking agent adapted to crosslink the above copolymer.

The crosslinking agent added in the intermediate layer is not particularly limited as long as the crosslinking agent can crosslink the copolymer, and a conventionally known crosslinking agent may be used.

Examples of the crosslinking agent include an epoxy-based crosslinking agent, an isocyanate-based crosslinking agent, a melamine-based crosslinking agent, a carbodiimide-based crosslinking agent, an oxazoline-based crosslinking agent, and a metal chelate-based crosslinking agent. Among these, the crosslinking agent is preferably a metal chelate-based crosslinking agent in terms of a long pot life and a rapid crosslinking reaction.

Specific examples of the metal chelate-based crosslinking agent include those in which a polyvalent metal atom is covalently- or coordinately-bonded to an organic compound. Examples of the polyvalent metal atom include Al, Zr, Co, Cu, Fe, Ni, V, Zn, In, Ca, Mg, Mn, Y, Ce, Sr, Ba, Mo, La, Sn, and Ti. Among these atoms, the polyvalent metal atom is preferably a polyvalent metal atom selected from Al, Zr, or Ti in terms of low cost and availability.

Examples of an atom in the organic compound to be covalently- or coordinate-bonded to the polyvalent metal atom include an oxygen atom. Examples of the organic compound include alkyl esters, alcohol compounds, carboxylic acid compounds, ether compounds, and ketone compounds.

In the invention, it is preferable to use aluminum tris (acetylacetonate) or the like, which is particularly stable and can be easily handled. The metal chelate-based crosslinking agent may be used in combination of two or more kinds thereof.

The content of the crosslinking agent in the intermediate layer is preferably from 0.01 parts by mass to 3.6 parts by mass, more preferably from 0.05 parts by mass to 3.0 parts by mass, and still more preferably from 0.1 parts by mass to 1.5 parts by mass, with respect to 100 parts by mass (a solid content) of the above copolymer. In a case in which the content of the crosslinking agent is within the above range, the resin included in the intermediate layer forms a three-dimensional crosslinking structure while maintaining adhesive properties, as a result of which the penetration of the resin into the gaps between the particles present in the particle-containing layer can be inhibited.

The intermediate layer may, if necessary, further include a known additive to the extent that the effect according to the invention is not impaired. Examples of the additive include a tackifier, a plasticizer, an antioxidant, a diluent, a filler, a thickener, an antifoaming agent, a flame retardant, and a preservative.

The intermediate layer in the invention has a crosslinking density of from more than 0 mol/m$^3$ to 450 mol/m$^3$. In the invention, in a case in which the crosslinking density of the intermediate layer is from more than 0 mol/m$^3$ to 450 mol/m$^3$, favorable interlayer adhesion properties (particularly, the adhesion property between the first resin layer and the intermediate layer) can be obtained, and also the penetration of the resin included in the intermediate layer into the gaps between the particles present in the particle-containing layer can be inhibited.

The crosslinking density of the intermediate layer in the invention is preferably from 10 mol/m$^3$ to 250 mol/m$^3$, and more preferably from 10 mol/m$^3$ to 150 mol/m$^3$.

The crosslinking density corresponds to the density of functional groups in crosslinking agent molecules added. The crosslinking density can be obtained by calculating the number of crosslinking points per unit volume assuming that the mole number of functional groups in the crosslinking agent molecules is the mole number of crosslinking points. The density of the functional groups in the copolymer included in the intermediate layer corresponds to the maximum calculational crosslinking point density.

Specifically, the weight (g) of the solid content of a copolymer solution is divided by the density (g/ml) of the copolymer to obtain the volume (ml) of the copolymer. Next, the weight (g) of the solid content of a crosslinking agent solution (g) is divided by the molecular weight of the crosslinking agent, and the obtained value is multiplied by the number of functional groups per molecule of the crosslinking agent to obtain a mole number (mmol) of the functional groups. Then, the mole number (mmol) of the functional groups is divided by the volume (ml) of the copolymer to obtain a crosslinking density (mmol/ml), which is then converted to an SI unit (mol/m$^3$).

The intermediate layer in the invention has a storage modulus of preferably from 50,000 Pa to 300,000 Pa, more preferably from 60,000 Pa to 280,000 Pa, and still more preferably from 80,000 Pa to 160,000 Pa. In a case in which the storage modulus of the intermediate layer is within the above range, the intermediate layer exhibits favorable adhesive properties at the boundary with the particle-containing layer, as a result of which the penetration of the resin included in the intermediate layer into the gaps between the particles present in the particle-containing layer can be inhibited.

The thickness of the intermediate layer is preferable from 2 μm to 30 μm, more preferably from 5 μm to 20 μm, and still more preferably from 8 μm to 12 μm, in terms of adhesive properties and low cost.

Method for Producing Multilayer Sheet

Hereinafter, an example of a method for producing a multilayer sheet according to the invention is described. The multilayer sheet according to the invention can be produced, for example, by the following steps (1) to (5). However, the invention is not limited thereto.

(1) The copolymer described above, the crosslinking agent described above, and a solvent are mixed together and then defoamed, thereby obtaining a coating liquid for forming an intermediate layer.

(2) The coating liquid for forming an intermediate layer thus obtained is applied onto a film that has been subjected to release treatment, and then the resultant is dried, thereby obtaining a sheet for forming an intermediate layer in which the intermediate layer is formed on the film that has been subjected to release treatment.

(3) The particles described above are dispersed in a solvent, thereby obtaining a dispersion solution as a coating liquid for forming a particle-containing layer. The obtained coating liquid is applied onto a film that serves as the second resin layer, thereby obtaining a sheet for forming a particle-containing layer in which the particle-containing layer is formed on the second resin layer.

(4) The sheet for forming the intermediate layer and a film that serves as the first resin layer are bonded together such that the intermediate layer and the first resin layer face each other, thereby transferring the intermediate layer onto the first resin layer.

(5) The sheet for forming the particle-containing layer and the sheet in which the intermediate layer has been transferred onto the first resin layer one on the other are bonded together such that the particle-containing layer and the intermediate layer face each other. The resultant are then sandwiched from both of the first resin layer-side and the second resin layer-side by a mold and subjected to thermoforming, thereby obtaining a multilayer sheet.

In the method for producing the multilayer sheet according to the invention, a method of applying each coating liquid is not particularly limited, and a conventionally known method can be used. Examples of the method of applying each coating liquid include spin coating, gravure coating, comma direct coating, comma reverse coating, lip coating, and die coating.

The method of layering the sheet for forming the particle-containing layer in which the particle-containing layer is formed on the second resin layer, and the sheet in which the intermediate layer has been transferred onto the first resin layer one on the other is not particularly limited.

EXAMPLES

Hereinafter, the invention is described more specifically by reference to examples. However, the invention is not limited to the examples, as long as the gist of the invention is retained.

Production of Acrylic Copolymer

Production Example 1

Acrylic Copolymer 1

Acrylic copolymer 1 was produced according to the following steps.

(1) In a 2-L separable round-bottom flask with a thermometer, a stirrer, a nitrogen inlet tube, a dropping funnel, and a reflux condenser, 291 parts by mass of butyl acrylate (BA), 9 parts by mass of acrylic acid (AA), and 190 parts by mass of ethyl acetate were placed and mixed.

(2) Into the obtained mixture solution, nitrogen gas was blown (bubbled) at a flow rate of 0.3 L/min for 30 minutes while stirring the solution at 100 rpm.

(3) Subsequently, the blowing (bubbling) of nitrogen gas into the mixture solution was stopped, and the solution was further stirred at 100 rpm while the head space of the reaction container was purged with nitrogen by blowing nitrogen gas from the nitrogen inlet tube on a top part of the reaction container, during which the inner temperature was increased to 70° C. over 30 minutes.

(4) 15 parts by mass of ethyl acetate and 0.006 parts by mass of azobisisobutyronitrile (hereinafter also referred to as "AIBN") as a polymerization initiator were mixed together, and the obtained AIBN/ethyl acetate solution was placed in the dropping funnel attached to the flask.

(5) After temperature increase ceased and the inner temperature stabilized at 70° C., the AIBN/ethyl acetate solution placed in the dropping funnel was added dropwise over 10 minutes to initiate a polymerization reaction.

(6) Five minutes after the dropping of the AIBN-ethyl acetate solution was completed, 20 parts by mass of ethyl acetate was further added dropwise thereto over 30 minutes.

(7) Immediately after the dropping was completed, an AIBN-ethyl acetate solution prepared by mixing 70 parts by mass of ethyl acetate and 0.007 parts by mass of AIBN was added dropwise thereto over 55 minutes.

(8) During a series of reactions, the inner temperature was adjusted so as to be maintained within a range of from 70° C. to 73° C.

(9) After the reaction was completed, the obtained reaction mixture was diluted with 635 parts by mass of ethyl acetate, thereby obtaining a solution of an acrylic copolymer 1.

The solution of the acrylic copolymer 1 had a viscosity of 8.48 Pa·s and a solid content of 12.0% by mass. The acrylic copolymer 1 had a weight average molecular weight (Mw) of 1,750,000 and a molecular weight distribution (Mw/Mn), expressed as a ratio of the weight average molecular weight (Mw) to a number average molecular weight (Mn), of 2.6.

Production Example 2

Acrylic Copolymer 2

A solution of an acrylic copolymer 2 was obtained in the same manner as Production Example 1, except that an AIBN-ethyl acetate solution prepared by mixing 259 parts by mass of ethyl acetate and 0.047 parts by mass of AIBN was subsequently added dropwise over 80 minutes immediately after the dropping performed in the step (7) was completed, and that the obtained reaction mixture was diluted with 376 parts by mass of ethyl acetate after the reaction was completed.

The solution of the acrylic copolymer 2 had a viscosity of 12.0 Pa·s and a solid content of 15.5% by mass. The acrylic copolymer 2 had a weight average molecular weight (Mw) of 1,750,000 and a molecular weight distribution (Mw/Mn) of 4.3.

Production Example 3

Acrylic Copolymer 3

A solution of an acrylic copolymer 3 was obtained in the same manner as Production Example 1, except that an AIBN-ethyl acetate solution prepared by mixing 259 parts by mass of ethyl acetate and 0.047 parts by mass of AIBN was subsequently added dropwise over 100 minutes immediately after the dropping performed in the step (7) was completed, and that the obtained reaction mixture was not diluted with ethyl acetate after the reaction was completed.

The solution of the acrylic copolymer 3 had a viscosity of 14.6 Pa·s and a solid content of 18.7% by mass. The acrylic copolymer 3 had a weight average molecular weight (Mw) of 1,750,000 and a molecular weight distribution (Mw/Mn) of 5.5.

Production Example 4

Acrylic Copolymer 4

A solution of an acrylic copolymer 4 was obtained in the same manner as Production Example 1, except that butyl acrylate (BA), acrylic acid (AA), and 2-hydroxyethyl acrylate (2HEA) were used in amounts of 249 parts by mass, 6 parts by mass, and 45 parts by mass, respectively, instead of butyl acrylate (BA) and acrylic acid (AA) employed in Production Example 1.

The solution of the acrylic copolymer 4 had a viscosity of 14.2 Pa·s and a solid content of 12.6% by mass. The acrylic copolymer 4 had a weight average molecular weight (Mw) of 1,750,000 and a molecular weight distribution (Mw/Mn) of 2.6.

Production Example 5

Acrylic Copolymer 5

A solution of an acrylic copolymer 5 was obtained in the same manner as Production Example 1, except that butyl acrylate (BA), acrylic acid (AA), and 2-hydroxyethyl acrylate (2HEA) were used in amounts of 270 parts by mass, 6 parts by mass, and 24 parts by mass, respectively, instead of butyl acrylate (BA) and acrylic acid (AA) employed in Production Example 1.

The solution of the acrylic copolymer 5 had a viscosity of 12.3 Pa·s and a solid content of 12.6% by mass. The acrylic copolymer 5 had a weight average molecular weight (Mw) of 1,750,000 and a molecular weight distribution (Mw/Mn) of 2.6.

Production Example 6

Acrylic Copolymer 6

A solution of an acrylic copolymer 6 was obtained in the same manner as Production Example 1, except that the amount of ethyl acetate added in the step (1) was changed from 190 parts by mass to 150 parts by mass.

The solution of the acrylic copolymer 6 had a viscosity of 10.0 Pa·s and a solid content of 12.8% by mass. The acrylic copolymer 6 had a weight average molecular weight (Mw) of 2,000,000 and a molecular weight distribution (Mw/Mn) of 2.6.

Production Example 7

Acrylic Copolymer 7

A solution of an acrylic copolymer 7 was obtained in the same manner as Production Example 1, except that 0.15 parts by mass of 1-dodecanethiol as a chain transfer agent was added in the step (1).

The solution of the acrylic copolymer 7 had a viscosity of 7.1 Pa·s and a solid content of 11.9% by mass. The acrylic copolymer 7 had a weight average molecular weight (Mw) of 1,200,000 and a molecular weight distribution (Mw/Mn) of 2.6.

Production Example 8

Acrylic Copolymer 8

A solution of an acrylic copolymer 8 was obtained in the same manner as Production Example 1, except that 0.20 parts by mass of 1-dodecanethiol as a chain transfer agent was added in the step (1).

The solution of the acrylic copolymer 8 had a viscosity of 5.3 Pa·s and a solid content of 11.8% by mass. In addition, the acrylic copolymer 8 had a weight average molecular weight (Mw) of 1,000,000 and a molecular weight distribution (Mw/Mn) of 2.6.

Production Example 9

Acrylic Copolymer 9

A solution of an acrylic copolymer 9 was obtained in the same manner as Production Example 1, except that 0.25 parts by mass of 1-dodecanethiol as a chain transfer agent was added in the step (1).

The solution of the acrylic copolymer 9 had a viscosity of 4.2 Pa·s and a solid content of 12.0% by mass. The acrylic copolymer 9 had a weight average molecular weight (Mw) of 800,000 and a molecular weight distribution (Mw/Mn) of 2.6.

Production Example 10

Acrylic Copolymer 10

A solution of an acrylic copolymer 10 was obtained in the same manner as Production Example 1, except that 0.30 parts by mass of 1-dodecanethiol as a chain transfer agent was added in the step (1).

The solution of the acrylic copolymer 10 had a viscosity of 2.9 Pa·s and a solid content of 12.0% by mass. The acrylic copolymer 10 had a weight average molecular weight (Mw) of 500,000 and a molecular weight distribution (Mw/Mn) of 2.6.

Production Example 11

Acrylic Copolymer 11

A solution of an acrylic copolymer 11 was obtained in the same manner as Production Example 1, except that an AIBN-ethyl acetate solution prepared by mixing 259 parts by mass of ethyl acetate and 0.047 parts by mass of AIBN was subsequently added dropwise over 140 minutes immediately after the dropping performed in the step (7) was completed, and that the obtained reaction mixture was diluted with 376 parts by mass of ethyl acetate after the reaction was completed.

The solution of the acrylic copolymer 11 had a viscosity of 16.7 Pa·s and a solid content of 21.2% by mass. The acrylic copolymer 11 had a weight average molecular weight (Mw) of 1,750,000 and a molecular weight distribution (Mw/Mn) of 6.5.

Production Example 12

Acrylic Copolymer 12

A solution of an acrylic copolymer 12 was obtained in the same manner as Production Example 1, except that 0.50 parts by mass of 1-dodecanethiol as a chain transfer agent was added in the step (1).

The solution of the acrylic copolymer 12 had a viscosity of 0.9 Pa·s and a solid content of 12.2% by mass. The acrylic copolymer 12 had a weight average molecular weight (Mw) of 200,000 and a molecular weight distribution (Mw/Mn) of 2.6.

Production Example 13

Acrylic Copolymer 13

A solution of an acrylic copolymer 13 was obtained in the same manner as Production Example 1, except that butyl acrylate (BA) and 2-hydroxyethyl acrylate (2HEA) were used in amounts of 286 parts by mass and 14 parts by mass, respectively, instead of butyl acrylate (BA) and acrylic acid (AA) employed in Production Example 1.

The solution of the acrylic copolymer 13 had a viscosity of 15.3 Pa·s and a solid content of 12.6% by mass. The acrylic copolymer 13 had a weight average molecular weight (Mw) of 1,750,000 and a molecular weight distribution (Mw/Mn) of 2.6.

Production Example 14

Acrylic Copolymer 14

A solution of an acrylic copolymer 14 was obtained in the same manner as Production Example 1, except that butyl acrylate (BA) and N,N-dimethylaminoethyl acrylate (DMAEA) were used in amounts of 283 parts by mass and 17 parts by mass, respectively, instead of butyl acrylate (BA) and acrylic acid (AA) employed in Production Example 1.

The solution of the acrylic copolymer 14 had a viscosity of 12.3 Pa·s and a solid content of 12.2% by mass. The acrylic copolymer 14 had a weight average molecular weight (Mw) of 1,750,000 and a molecular weight distribution (Mw/Mn) of 2.6.

Production Example 15

Acrylic Copolymer 15

A solution of an acrylic copolymer 15 was obtained in the same manner as Production Example 1, except that butyl acrylate (BA) and glycidyl methacrylate (GMA) were used in amounts of 283 parts by mass and 17 parts by mass, respectively, instead of butyl acrylate (BA) and acrylic acid (AA) employed in Production Example 1.

The solution of the acrylic copolymer 15 had a viscosity of 11.7 Pa·s and a solid content of 12.5% by mass. The acrylic copolymer 15 had a weight average molecular weight (Mw) of 1,750,000 and a molecular weight distribution (Mw/Mn) of 2.6.

Production of Optical Sheet

Example 1

An optical sheet of Example 1 was produced according to the following steps.

(1) 8.37 parts by mass of the solution of the acrylic copolymer 1 obtained by the above production method, 0.010 parts by mass of an aluminum chelate-based crosslinking agent solution (a mixture of aluminum chelate A (6.5 parts by mass) manufactured by Kawaken Fine Chemical Co., Ltd., acetylacetone (6.0 parts by mass), and toluene (87.5 parts by mass)), and 5 parts by mass of ethyl acetate were mixed and defoamed, thereby obtaining a coating liquid for forming an intermediate layer. The obtained coating liquid was applied onto a polyethylene terephthalate (PET) film that has been subjected to release treatment using a 13-mil applicator, and the resultant was dried at 120° C. for 2 minutes, thereby forming an intermediate layer 1.

The dried film thickness of the intermediate layer 1 formed on the PET film was 10 μm.

(2) 1 part by mass of a 2-propanol dispersion liquid of hollow silica (trade name: SLURIA 4110, produced by JGC C&C, solid content: 20.5% by mass, average particle diameter: about 60 nm) and 3 parts by mass of 2-propanol were mixed, and the obtained mixture was filtered through a 0.45 μm filter, thereby obtaining a coating liquid for forming a particle-containing layer. The obtained coating liquid was applied onto a polycarbonate film (trade name: IUPILON FE-2000B produced by Mitsubishi Engineering-Plastics Corporation, thickness: 75 μm, a second resin layer) using a wire bar #18, and then the resultant was dried at 100° C. for 1 minute, thereby forming a particle-containing layer 1.

The dried thickness of the particle-containing layer 1 formed on the second resin layer was 1.2 μm. The refractive index of the particle-containing layer was 1.17. The refractive index was measured with respect to light having a wavelength of 633 nm using a spectroscopic ellipsometer (M-2000V manufactured by J. A. Woollam Japan Corp).

(3) The intermediate layer 1 (film thickness: 10 μm) formed on the PET film that has been subjected to release treatment was transferred onto a polycarbonate film (trade name: UNI-PLUS LC-320F manufactured by Mitsubishi Engineering-Plastics Corporation, thickness: 300 μm, a first resin layer) using a hand rubber roller.

(4) Subsequently, the polycarbonate film (the second resin layer) in which the particle-containing layer 1 was formed on one surface thereof and the polycarbonate film (the first resin layer) in which the intermediate layer 1 was formed on one surface thereof were bonded together by using a hand rubber roller such that the particle-containing layer 1 and the intermediate layer 1 faced each other.

(5) The bonded sheets were sandwiched from both of the first resin layer-side and the second resin layer-side by a mold and subjected to thermoforming at a temperature of 170° C. with a pressure of 10 MPa for 5 minutes, thereby obtaining an optical sheet of Example 1.

Example 2

An optical sheet of Example 2 was obtained in the same manner as Example 1, except that the amount of the aluminum chelate-based crosslinking agent solution added in the step (1) was changed from 0.010 parts by mass to 0.019 parts by mass, to produce an intermediate layer 2.

Example 3

An optical sheet of Example 3 was obtained in the same manner as Example 1, except that the amount of the aluminum chelate-based crosslinking agent solution added in the step (1) was changed from 0.010 parts by mass to 0.063 parts by mass, to produce an intermediate layer 3.

Example 4

An optical sheet of Example 4 was obtained in the same manner as Example 1, except that the amount of the aluminum chelate-based crosslinking agent solution added in the step (1) was changed from 0.010 parts by mass to 0.123 parts by mass, to produce an intermediate layer 4.

Example 5

An optical sheet of Example 5 was obtained in the same manner as Example 1, except that the amount of the aluminum chelate-based crosslinking agent solution added in the step (1) was changed from 0.010 parts by mass to 0.185 parts by mass, to produce an intermediate layer 5.

Example 6

An optical sheet of Example 6 was obtained in the same manner as Example 1, except that the amount of the aluminum chelate-based crosslinking agent solution added in the step (1) was changed from 0.010 parts by mass to 0.246 parts by mass, to produce an intermediate layer 6.

Example 7

An optical sheet of Example 7 was obtained in the same manner as Example 1, except that the amount of the aluminum chelate-based crosslinking agent solution added in the step (1) was changed from 0.010 parts by mass to 0.662 parts by mass, to produce an intermediate layer 7.

Example 8

An optical sheet of Example 8 was obtained in the same manner as Example 1, except that the amount of the aluminum chelate-based crosslinking agent solution added in the step (1) was changed from 0.010 parts by mass to 0.123 by parts mass, and the acrylic copolymer 2 was used instead of the acrylic copolymer 1, to produce an intermediate layer 8.

Example 9

An optical sheet of Example 9 was obtained in the same manner as Example 1, except that the amount of the aluminum chelate-based crosslinking agent solution added in the step (1) was changed from 0.010 parts by mass to 0.123 parts by mass, and the acrylic copolymer 3 was used instead of the acrylic copolymer 1, to produce an intermediate layer 9.

Example 10

An optical sheet of Example 10 was obtained in the same manner as Example 1, except that the amount of the aluminum chelate-based crosslinking agent solution added in the step (1) was changed from 0.010 parts by mass to 0.123 parts by mass, and the acrylic copolymer 4 was used instead of the acrylic copolymer 1, to produce an intermediate layer 10.

Example 11

An optical sheet of Example 11 was obtained in the same manner as Example 1, except that the amount of the aluminum chelate-based crosslinking agent solution added in the step (1) was changed from 0.010 parts by mass to 0.123 parts by mass, and the acrylic copolymer 5 was used instead of the acrylic copolymer 1, to produce an intermediate layer 11.

Example 12

An optical sheet of Example 12 was obtained in the same manner as Example 1, except that the amount of the aluminum chelate-based crosslinking agent solution added in the step (1) was changed from 0.010 parts by mass to 0.123 parts by mass, and the acrylic copolymer 6 was used instead of the acrylic copolymer 1, to produce an intermediate layer 12.

Example 13

An optical sheet of Example 13 was obtained in the same manner as Example 1, except that the amount of the aluminum chelate-based crosslinking agent solution added in the step (1) was changed from 0.010 parts by mass to 0.123 parts by mass, and the acrylic copolymer 7 was used instead of the acrylic copolymer 1, to produce an intermediate layer 13.

Example 14

An optical sheet of Example 14 was obtained in the same manner as Example 1, except that the amount of the aluminum chelate-based crosslinking agent solution added in the step (1) was changed from 0.010 parts by mass to 0.123 parts by mass, and the acrylic copolymer 8 was used instead of the acrylic copolymer 1, to produce an intermediate layer 14.

Example 15

An optical sheet of Example 15 was obtained in the same manner as Example 1, except that the amount of the aluminum chelate-based crosslinking agent solution added in the step (1) was changed from 0.010 parts by mass to 0.123 parts by mass, and the acrylic copolymer 9 was used instead of the acrylic copolymer 1, to produce an intermediate layer 15.

Example 16

An optical sheet of Example 16 was obtained in the same manner as Example 1, except that the amount of the aluminum chelate-based crosslinking agent solution added in the step (1) was changed from 0.010 parts by mass to 0.123 parts by mass, and the acrylic copolymer 10 was used instead of the acrylic copolymer 1, to produce an intermediate layer 16.

Example 17

An optical sheet of Example 17 was obtained in the same manner as Example 1, except that the acrylic copolymer 13 was used instead of the acrylic copolymer 1, and, in the step (1), 0.0015 parts by mass of an isocyanate-based crosslinking agent (trade name: CORONATE L, manufactured by Nippon Polyurethane Industry Co., Ltd.) was used instead of 0.010 parts by mass of the aluminum chelate-based crosslinking agent solution and curing at 50° C. for 72 hours was performed after the applying and drying.

Example 18

An optical sheet of Example 18 was obtained in the same manner as Example 1, except that the acrylic copolymer 14 was used instead of the acrylic copolymer 1 and, in the step (1), 0.0003 parts by mass of glutaraldehyde was used instead of 0.010 parts by mass of the aluminum chelate-based crosslinking agent solution, to produce an intermediate layer 18.

Example 19

An optical sheet of Example 19 was obtained in the same manner as Example 1, except that the acrylic copolymer 15 was used instead of the acrylic copolymer 1, and, in the step (1), 0.0010 parts by mass of an acid anhydride-based crosslinking agent (trade name: RIKACID MH-700 manufactured by New Japan Chemical Co., Ltd.) was used instead of 0.010 parts by mass of the aluminum chelate-based crosslinking agent solution, to produce an intermediate layer 19.

Comparative Example 1

An optical sheet of Comparative Example 1 was obtained in the same manner as Example 1, except that the amount of the aluminum chelate-based crosslinking agent solution added in the step (1) was changed from 0.010 parts by mass to 0.123 parts by mass, and the acrylic copolymer 11 was used instead of the acrylic copolymer 1, to produce an intermediate layer 20.

Comparative Example 2

An optical sheet of Comparative Example 2 was obtained in the same manner as Example 1, except that the amount of the aluminum chelate-based crosslinking agent solution added in the step (1) was changed from 0.010 parts by mass to 0.123 parts by mass, and the acrylic copolymer 12 was used instead of the copolymer 1, to produce an intermediate layer 21.

Comparative Example 3

An optical sheet of Comparative Example 3 was obtained in the same manner as Example 1, except that the amount of the aluminum chelate-based crosslinking agent solution added in the step (1) was changed from 0.010 parts by mass to 0.697 parts by mass, to produce an intermediate layer 22.

Comparative Example 4

An optical sheet of Comparative Example 4 was obtained in the same manner as Example 1, except that an intermediate layer 23 was produced without adding any aluminum chelate-based crosslinking agent solution in the step (1).

The dried film thickness of each of the intermediate layers 2 to 23 formed on the PET film was 10 μm. The refractive index of each of the particle-containing layers in Examples 2 to 19 and Comparative Examples 1 to 4 was 1.17.

Measurement Method

Measurement of Viscosity

The viscosity of each of the acrylic copolymer solutions was measured using a viscometer (a BM II type viscometer, manufactured by Toki Sangyo Co., Ltd.) under the following measurement conditions.

Rotor used: No. 4
Number of rotations of rotor: 12 min$^{-1}$
Temperature: 25° C.

Measurements of Weight Average Molecular Weight and Molecular Weight Distribution The weight average molecular weight (Mw) of each of the above acrylic copolymers and the molecular weight distribution (Mw/Mn) thereof, expressed as the ratio of a weight average molecular weight (Mw) to a number average molecular weight (Mn), were calculated based on calibration with polystyrene standards using gel permeation chromatography (GPC).

The measurement with GPC was performed under the following conditions.

Conditions

Measurement apparatus: high-speed GPC (HLC-8220 manufactured by Tosoh Corporation)

Detector: differential refractive index meter (RI) (integrated into HLC-8220, manufactured by Tosoh Corporation)

Column: two TSK-GEL SUPER MULTIPORE HZ-H (manufactured by Tosoh Corporation) columns connected in series Column size: 4.6 mm ID×15 cm
Column temperature: 40° C.
Eluent: tetrahydrofuran
Sample concentration: 90 mg/mL
Injection volume: 10 µL
Flow rate: 0.35 mL/min.

Measurement of Storage Modulus G'

The storage modulus of each of the intermediate layers was measured by the following method.

About 1 g of resin was collected from the intermediate layer and placed on a sample stage (a disk-shaped plate (a fixed flat plate, plate name: TMP-10; material: aluminum)) of a rheometer (RS600, manufactured by HAAKE Co., Ltd). A sensor (diameter: 10 mm; sensor name: P10 CS L Disp A1; material: aluminum) of the rheometer was moved gradually toward the sample stage to set a measurement gap at a position of 1 mm therefrom. At this time, any resin pushed out around a measurement section was removed so as not to have any influence on the measurement.

The temperature of the plate was set to 25° C., and then increased from 25° C. to 200° C. over 1050 seconds while applying a shearing stress at a frequency of 1 Hz, to measure a storage modulus G' (Pa). In the present measurement, the storage modulus G' had a substantially constant value regardless of the temperature. Accordingly, an average of measurement values (an arithmetic average) was directly employed as the value of the storage modulus G'.

Calculation of Crosslinking Density

The crosslinking density corresponds to the density of functional groups in crosslinking agent molecules added. The crosslinking density was obtained by calculating the number of crosslinking points per unit volume assuming that the mole number of functional groups in the crosslinking agent molecules is the mole number of crosslinking points.

The density of the functional groups in the resin included in the intermediate layer corresponds to the maximum calculational crosslinking point density.

Specifically, for example, in the case of the intermediate layer 1, the solid content (1.00 g) of the resin solution (8.37 g) was divided by the density (1.1 g/ml) of the resin to obtain the volume (0.91 ml) of the resin.

Next, the weight of the solid content (0.00065 g) of the crosslinking agent solution (0.010 g) used for forming the intermediate layer 1 was divided by the molecular weight (327) of the crosslinking agent, and then multiplied by the number (3) of the functional groups per molecule of the crosslinking agent, to obtain the mole number (0.0060 mmol) of the functional groups.

Then, the mole number (0.0060 mmol) of the functional group was divided by the volume of the resin (0.91 ml) to obtain a crosslinking density (0.0065 mmol/ml, SI unit conversion value: 6.5 mol/m$^3$).

Evaluation

1. Confirmation of Gaps

The optical sheets of Examples 1 to 19 and Comparative Examples 1 to 4 were cut into strips each having a width of 5 mm and a length of 20 mm, and the strips were immersed in liquid nitrogen to be freeze-fractured. The section of the freeze-fractured optical sheet was observed under a field emission scanning electron microscope (FE-SEM).

As a result of the observation, it was confirmed that gaps were formed between the particles in the particle-containing layers of all of the optical sheets.

2. Refractive Index

The refractive index of each of the particle-containing layers in the optical sheets of Examples 1 to 19 and Comparative Examples 1 to 4 was measured by the following steps.

Figure 4:
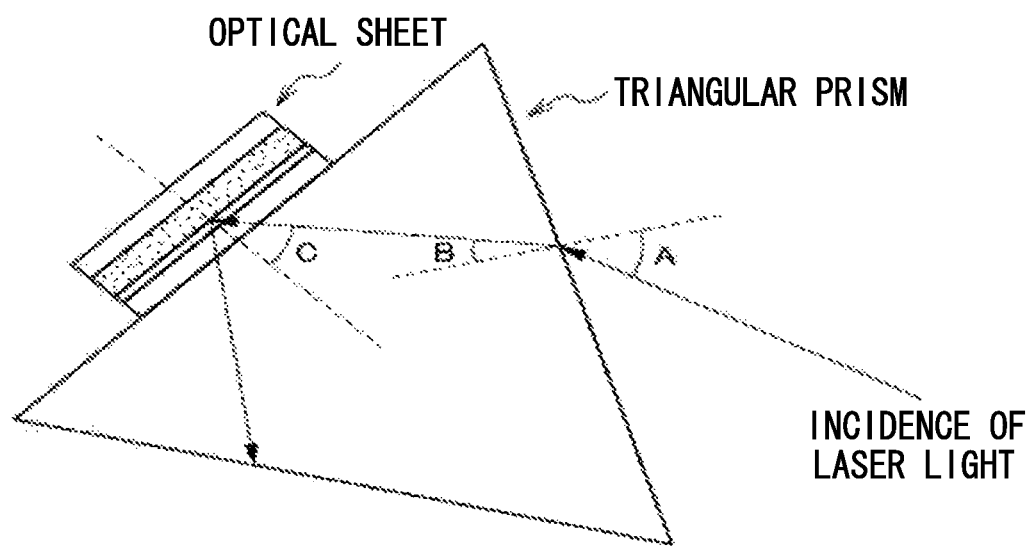
FIG. 4 is a diagram illustrating a method of measuring a refractive index.

As illustrated in FIG. 4, the optical sheet was closely attached to a triangular prism, and exposed to laser light from the first resin layer side of the optical sheet through the triangular prism. The incident angle of the laser light was gradually increased from 0. The laser light initially penetrated through to the second resin layer side, but became to be totally reflected at the boundary with the particle-containing layer as the incident angle increased. The angle at which the switch to the total reflection occurred was measured. Then, based on the angle, the refractive index of the particle-containing layer was calculated by the following equation and evaluated according to the following evaluation criteria.

In FIG. 4, "A" represents the incident angle of the laser light that falls upon the triangular prism, "B" represents the refraction angle of the laser light that has entered into the triangular prism, and "C" represents the incident angle (0 degree<C<90 degrees) of the laser light that falls on the optical sheet from the triangular prism, and also corresponds to an angle at which the switch to the total reflection at the boundary with the particle-containing layer occurred when the incident angle is gradually increased from 0 degree.

In the following equation, "C" corresponds to the "C" shown in FIG. 4, and "1.779" means the refractive index of the triangular prism.

Refractive index=Sin C×1.779

Here, those ranked as the criteria "A" and "B" are acceptable for practical use.

Evaluation Criteria

A: Refractive index is 1.200 or less.
B: Refractive index is from more than 1.200 to less than 1.250.
C: Refractive index is 1.250 or more.

3. Adhesion Strength

The adhesion strength in each of the optical sheets of Examples 1 to 19 and Comparative Examples 1 to 4 was measured by the following steps to confirm the adhesion property between the first resin layer and the intermediate layer.

(1) The optical sheet was cut out into pieces each having a width of 25 mm and a length of 100 mm, and separation of the layers was performed at one side end of each piece for over about 10 mm by hand.

(2) A double-sided tape having a width of 25 mm was attached to the first resin layer side of the optical sheet, and the sheet was attached onto an aluminum plate.

(3) Using a tensile tester (STA-1225 manufactured by Orientec Co., Ltd.), the one end of the second resin layer that was separated for about 10 mm was gripped, and peeling was performed under conditions of a peel-off angle of 90 degrees and a peel-off speed of 300 mm/min under an atmosphere with a temperature of 23° C. and a humidity of 65% RH to measure an adhesion strength (N/25 mm). Then, evaluation was performed according to the following evaluation criteria. The evaluation results are shown in Table 1.

Here, those ranked as the criteria "A" and "B" are acceptable for practical use.

Evaluation Criteria
- A: Adhesion strength is 3.0 N/25 mm or more.
- B: Adhesion strength is from more than 1.0 N/25 mm to less than 3.0 N/25 mm.
- C: Adhesion strength is 1.0 N/25 mm or less.

suppression of an increase in the refractive index and high adhesion strength.

The disclosure of Japanese Patent Application No. 2013-083271 is incorporated by reference herein in its entirety.

All publications, patent applications, and technical standards mentioned in this description are herein incorporated by reference to the same extent as if each individual publication, patent application, or technical standard was specifically and individually indicated to be incorporated by reference.

The invention claimed is:

1. A multilayer sheet, comprising:
   a first resin layer;
   a second resin layer;
   a particle-containing layer disposed at least between the first resin layer and the second resin layer, the particle-containing layer comprising a plurality of particles and gaps formed between the particles; and

TABLE 1

| | | Acrylic copolymer | | | | | | Intermediate layer | | | Evaluation result | | | |
|---|---|---|---|---|---|---|---|---|---|---|---|---|---|---|
| | | Composition (% by mole) | | | | | Molecular weight Mw | Molecular weight distribution Mw/Mn | | Cross-linking density | Storage modulus | Refractive | Evaluation | Adhesion strength | Evaluation |
| | No. | BA | AA | 2HEA | DMAEA | GMA | Mw | Mw/Mn | No. | (mol/m³) | (Pa) | index | tion | (N/25 mm) | tion |
| Ex. 1 | 1 | 94.8 | 5.2 | — | — | — | 1,750,000 | 2.6 | 1 | 6.5 | 66,634 | 1.201 | B | 6.9 | A |
| Ex. 2 | 1 | 94.8 | 5.2 | — | — | — | 1,750,000 | 2.6 | 2 | 12.3 | 77,926 | 1.188 | A | 3.9 | A |
| Ex. 3 | 1 | 94.8 | 5.2 | — | — | — | 1,750,000 | 2.6 | 3 | 40.9 | 95,936 | 1.185 | A | 4.0 | A |
| Ex. 4 | 1 | 94.8 | 5.2 | — | — | — | 1,750,000 | 2.6 | 4 | 80.7 | 146,938 | 1.183 | A | 3.7 | A |
| Ex. 5 | 1 | 94.8 | 5.2 | — | — | — | 1,750,000 | 2.6 | 5 | 122.1 | 159,530 | 1.184 | A | 3.0 | A |
| Ex. 6 | 1 | 94.8 | 5.2 | — | — | — | 1,750,000 | 2.6 | 6 | 163.4 | 172,122 | 1.184 | A | 2.1 | B |
| Ex. 7 | 1 | 94.8 | 5.2 | — | — | — | 1,750,000 | 2.6 | 7 | 440.0 | 272,134 | 1.184 | A | 1.1 | B |
| Ex. 8 | 2 | 94.8 | 5.2 | — | — | — | 1,750,000 | 4.3 | 8 | 80.7 | 67,408 | 1.197 | A | 3.3 | A |
| Ex. 9 | 3 | 94.8 | 5.2 | — | — | — | 1,750,000 | 5.5 | 9 | 80.7 | 63,352 | 1.229 | B | 3.0 | A |
| Ex. 10 | 4 | 80.5 | 3.4 | 16.1 | — | — | 1,750,000 | 2.6 | 10 | 80.7 | 77,301 | 1.181 | A | 5.1 | A |
| Ex. 11 | 5 | 87.9 | 3.5 | 8.6 | — | — | 1,750,000 | 2.6 | 11 | 80.7 | 94,341 | 1.187 | A | 4.4 | A |
| Ex. 12 | 6 | 94.8 | 5.2 | — | — | — | 2,000,000 | 2.6 | 12 | 80.7 | 69,423 | 1.192 | A | 3.7 | A |
| Ex. 13 | 7 | 94.8 | 5.2 | — | — | — | 1,200,000 | 2.6 | 13 | 80.7 | 68,714 | 1.192 | A | 3.6 | A |
| Ex. 14 | 8 | 94.8 | 5.2 | — | — | — | 1,000,000 | 2.6 | 14 | 80.7 | 67,135 | 1.201 | B | 3.6 | A |
| Ex. 15 | 9 | 94.8 | 5.2 | — | — | — | 800,000 | 2.6 | 15 | 80.7 | 65,988 | 1.209 | B | 3.4 | A |
| Ex. 16 | 10 | 94.8 | 5.2 | — | — | — | 500,000 | 2.6 | 16 | 80.7 | 64,730 | 1.218 | B | 3.4 | A |
| Ex. 17 | 13 | 94.8 | — | 5.2 | — | — | 1,750,000 | 2.6 | 17 | 80.7 | 63,537 | 1.203 | B | 4.3 | A |
| Ex. 18 | 14 | 94.8 | — | — | 5.2 | — | 1,750,000 | 2.6 | 18 | 80.7 | 63,536 | 1.210 | B | 4.7 | A |
| Ex. 19 | 15 | 94.8 | — | — | — | 5.2 | 1,750,000 | 2.6 | 19 | 80.7 | 72,400 | 1.203 | B | 4.2 | A |
| Comp. Ex. 1 | 11 | 94.8 | 5.2 | — | — | — | 1,750,000 | 6.5 | 20 | 80.7 | 63,002 | 1.261 | C | 2.8 | B |
| Comp. Ex. 2 | 12 | 94.8 | 5.2 | — | — | — | 200,000 | 2.6 | 21 | 80.7 | 62,124 | 1.331 | C | 5.2 | A |
| Comp. Ex. 3 | 1 | 94.8 | 5.2 | — | — | — | 1,750,000 | 2.6 | 22 | 457.5 | 289,228 | 1.185 | A | 0.6 | C |
| Comp. Ex. 4 | | 94.8 | 5.2 | — | — | — | 1,750,000 | 2.6 | 23 | 0.0 | 58,970 | 1.329 | C | 7.0 | A |

Ex.: Example;
Comp. Ex.: Comparative Example

As shown in Table 1, in Examples, it was found that an increase in the refractive index of the particle-containing layer was sufficiently suppressed, and also favorable adhesion properties between the first resin layer and the intermediate layer were achieved.

In contrast, it was found that Comparative Examples, which included an intermediate layer formed from a composition not including the specific acrylic copolymer, or an intermediate layer formed from a composition including the specific acrylic copolymer but having a crosslinking density that falls outside the specific range, failed to achieve both of an intermediate layer disposed at at least one selected from (i) between the first resin layer and the particle-containing layer or (ii) between the second resin layer and the particle-containing layer, the intermediate layer comprising a copolymer having a weight average molecular weight (Mw) of 1,200,000 to 5,000,000 and having a molecular weight distribution (Mw/Mn), expressed as a ratio of a weight average molecular weight (Mw) to a number average molecular weight (Mn), of 4.5 or less, and a structural moiety derived from a crosslinking agent adapted to crosslink the copolymer, the intermediate layer having a crosslinking density of from 12.3 mol/m$^3$ to 122.1 mol/m$^3$, and wherein the multilayer sheet has an adhesion strength of 3.0 N/25 mm or more and a refractive index of 1.20 or less.

2. The multilayer sheet according to claim 1, wherein the copolymer is a (meth)acrylic copolymer comprising:
   a structural unit A derived from a (meth)acrylate; and
   a structural unit B derived from a monomer having at least one functional group selected from a hydroxy group, a carboxy group, a phosphate group, a cyano group, an epoxy group, or an amino group.

3. The multilayer sheet according to claim 2, wherein a content of the structural unit A in the (meth)acrylic copolymer is from 50% by mole to 99% by mole with respect to a total mole number of monomer-derived structural units in the (meth)acrylic copolymer.

4. The multilayer sheet according to claim 2, wherein a content of the structural unit B in the (meth)acrylic copolymer is from 1% by mole to 50% by mole with respect to a total mole number of monomer-derived structural units in the (meth)acrylic copolymer.

5. The multilayer sheet according to claim 1, wherein each of the first resin layer and the second resin layer independently comprises at least one selected from a carbonate resin, a (meth)acrylic resin, an ester resin, a styrene resin, a vinyl chloride resin, a fluorine resin, an olefin resin, a cellulose acetate resin, a silicone resin, an amide resin, an epoxy resin, an acrylonitrile resin, a urethane resin, an imide resin, or a polyether sulfone.

6. The multilayer sheet according to claim 1, wherein the particles have an average particle diameter of from 5 nm to 300 nm.

7. The multilayer sheet according to claim 6, wherein the particles are hollow particles.

8. The multilayer sheet according to claim 1, wherein the particles are hollow particles.

9. The multilayer sheet according to claim 1, wherein the intermediate layer has a storage modulus of from 60,000 Pa to 280,000 Pa.

10. The multilayer sheet according to claim 1, wherein at least one layer selected from the first resin layer or the second resin layer is a prism layer or a lens layer.

* * * * *